Sept. 29, 1925. 1,555,264
L. F. BURNHAM
CURRENT COLLECTOR
Filed July 5, 1922
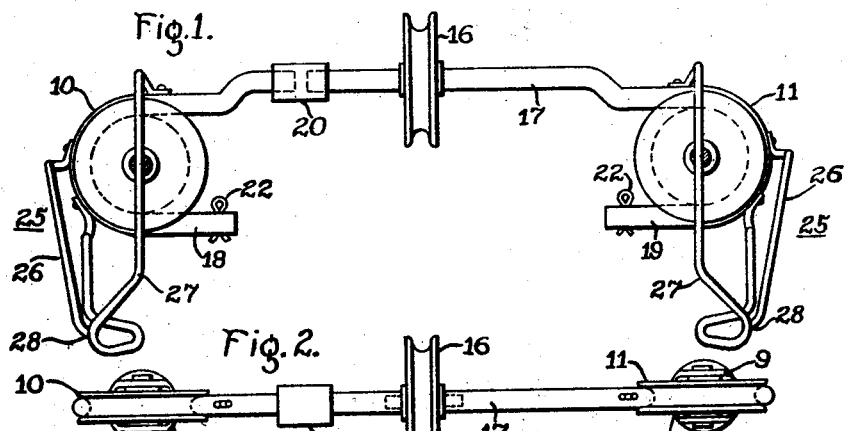
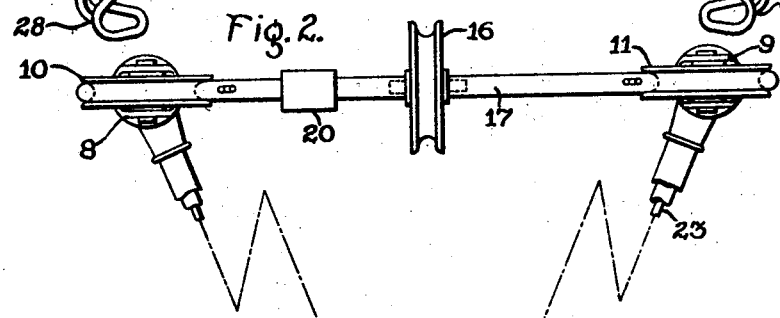
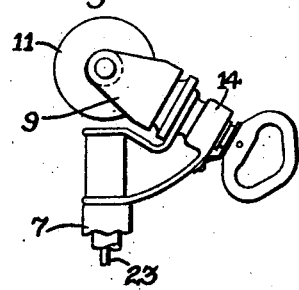
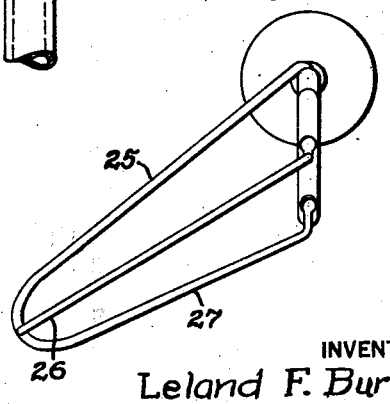
WITNESSES:
INVENTOR
Leland F. Burnham.
BY
ATTORNEY Patented Sept. 29, 1925.

1,555,264

UNITED STATES PATENT OFFICE.

LELAND F. BURNHAM, OF WILKINSBURG, PENNSYLVANIA, ASSIGNOR TO R. D. NUTTALL COMPANY, A CORPORATION OF PENNSYLVANIA.

CURRENT COLLECTOR.

Application filed July 5, 1922. Serial No. 572,931.

*To all whom it may concern:*

Be it known that I, LELAND F. BURNHAM, a citizen of the United States, and a resident of Wilkinsburg, in the county of Allegheny and State of Pennsylvania, have invented a new and useful Improvement in Current Collectors, of which the following is a specification.

My invention relates to current collectors and particularly to collectors for use in connection with trackless trolleys.

My invention has for its objects the provision of means whereby an auxiliary current collector may be conveniently mounted upon a trolley pole, or other suitable structure, that is employed for supporting the main current collectors, and means for preventing the entanglement of the collectors with the line structure.

In using trackless-trolley busses, it is sometimes found desirable to house them in the ordinary trolley-car barns, as in case the trolley bus serves as a feeder for the usual trolley line. To do this, it may be necessary to drive the bus parallel to the car tracks and thereby utilize the single conductor or trolley wire.

On trolley busses, especially of the type wherein two collectors are mounted upon a single pole, it is necessary to provide an auxiliary collector for conducting current from the single trolley wire, due to the fact that neither of the two collectors used during normal operation could properly co-operate with an ordinary single line trolley wire.

As shown in the accompanying drawings,

Figure 1 is a view, in front elevation, of a pair of current collectors embodying my invention, Fig. 2 is a plan view illustrating the application of the device to a trolley pole, Fig. 3 is a detailed view of one of the main current collectors in side elevation, and Fig. 4 is a side elevational view of a portion of the apparatus shown in Fig. 1.

The apparatus comprising a pole 4, only a portion of which is shown, is mounted upon the roof of a vehicle in the usual manner. The pole is provided with a pair of helical springs 5 that serve as yielding supports for contact-carrying arms 6 and 7 that are provided, at their upper ends, with harps 8 and 9 which carry current collectors 10 and 11, respectively. The arms 6 and 7 are insulated from the harps 8 and 9 by tubes 12 of any suitable insulating material.

The trolley harps, which are of the usual swivel type, are mounted for rotative movement in brackets 14 and are what are commonly designated in the art as swivel harps. The collectors 10 and 11 ordinarily lie in substantially vertical parallel planes and the harps 8 and 9 may be so rotated in their supports that the wheels 10 and 11 will lie in a common transverse plane, as shown more clearly in Figs. 1 and 2.

Ordinarily, the harps 9 and 10, together with the trolley wheels 10 and 11 will occupy substantially parallel planes as indicated in Fig. 3, in position to co-operate with a pair of overhead wires, not shown, such as are required in supplying electric current to a trackless vehicle or trolley bus. However, whenever it is desired to drive the vehicle along a one-wire trolley line, a grounding shoe may be employed to engage one of the rails of the track and it is desirable to employ an auxiliary collector. If one of the main current collectors were brought into engagement with a trolley wire, the pole would be thrown out of balance.

In order to enable the vehicle to be conveniently supplied with current from a single overhead wire, I provide an auxiliary current collector 16 that is rotatably mounted upon a bar 17 that has hook ends 18 and 19. A block of insulating material 20 prevents current flowing from the collector 16 to the trolley wheel 10.

When it is desired to use the auxiliary collector, the pole 4 is retracted, and one of the hook ends of the bar 17 is placed in the tread of one of the trolley wheels, the wheel being turned in its swivel support to the position illustrated in Figs. 1 and 2. The other wheel is then similarly turned and the outer ends of the arms 6 and 7 are moved inwardly to permit the other hook 10 of the bar 17 to engage the tread of the last mentioned wheel. Cotter pins 22 may be employed to prevent accidental dislodgement of the hooks from the trolley wheels.

It will be seen that current may flow from the trolley wheel 16 to the wheel 11 and thence through a conductor 23 to the apparatus within the vehicle.

Each end of the bar 17 has a guard 25 secured thereto, the guards each consisting of rods 26 and 27 bent in the manner shown and welding together at 28. These guards serve to prevent the overhead line structure from becoming entangled beneath the collectors 10 and 11 when the auxiliary collector is being employed. The hook portions of the guards 25 embrace the arms 6 and 7 of the pole head.

It is obvious that other forms of current collectors and trolley wheels may be employed, that the auxiliary current collector need not necessarily be supported from the treads of the main current collectors but may be supported from some point on one of the arms 6 or 7, and that if the outer ends of the arms 6 and 7 were rigidly spaced, a detachable joint could be provided in the supporting bar of an auxiliary collector to permit of ready assemblage or a tension spring could be placed between longitudinal sections of such bar.

Various changes in detail and arrangement may be made without departing from the spirit and scope of the invention, as defined in the accompanying claims.

I claim as my invention:

1. The combination with a trolley pole provided with a pair of laterally spaced current collectors, of an auxiliary collector detachably secured to the first named collectors.

2. The combination with a trolley pole provided with a pair of laterally spaced current collectors, of an auxiliary collector detachably secured to the first named collectors and disposed intermediately thereof.

3. The combination with a trolley pole provided with a pair of spaced current collectors, of an auxiliary collector detachably secured to the first named collectors.

4. The combination with a trolley pole provided with a pair of laterally spaced current collectors, of an auxiliary collector detachably secured to the first named collectors, the auxiliary collector being insulated from one of the other collectors.

5. The combination with a trolley pole provided with a pair of laterally spaced current collectors, of an auxiliary collector detachably secured to the first named collectors, the auxiliary collector having electrical connection with one of the other collectors.

6. The combination with a trolley pole provided with a pair of yieldingly supported arms, of a grooved current collector carried by each of the arms, means for permitting the current collectors to turn to positions wherein their grooves lie in a common transverse plane, and means for securing an auxiliary collector in the grooves of said first named collectors.

7. The combination with a trolley pole provided with a pair of yieldingly supported arms, of a grooved current collector carried by each of the arms, means for permitting the current collectors to turn to positions wherein their grooves lie in a common transverse plane, a bar having an auxiliary collector mounted thereon secured in the grooves of said first named collectors. and means for preventing accidental displacement of the bar.

8. The combination with a trolley pole provided with a pair of yieldingly supported arms, of an annularly grooved current collector carried by each of the arms, means for permitting the current collectors to turn to positions wherein their grooves lie in a common transverse plane, and a bar having an auxiliary collector mounted upon a bar adapted to be carried in the grooves of said collectors, said bar having its ends formed to the shape of the collector wheels.

9. The combination with a trolley pole provided with a pair of yieldingly supported arms, of an annularly grooved wheel current collector carried by each of the arms, means for permitting the current collectors to turn to positions wherein their grooves lie in a common transverse plane, means for carrying a bar on said collectors, means for mounting an auxiliary collector on said bar and means for insulating the auxiliary collector from one end of the bar.

10. The combination with a trolley pole provided with a pair of yieldingly supported arms, of a grooved current collector carried by each of the arms, means for permitting the current collectors to turn to positions wherein their grooves lie in a common transverse plane, a bar having curved ends and an auxiliary collector mounted thereon disposed in the grooves of said collectors and means for preventing the trolley line structure from becoming entangled with the first named collectors when the auxiliary collector is in place.

11. The combination with a trolley pole provided with a pair of yieldingly supported arms, of a grooved current collector carried by each of the arms, means for permitting the current collectors to turn to positions wherein their grooves lie in a common transverse plane, a bar connecting said collectors, an auxiliary collector mounted on said bar and means carried by the said bar for preventing the trolley line structure from becoming entangled with the first named collectors when the auxiliary collector is in place.

12. The combination with a trolley pole provided with a pair of spaced current collectors, of an auxiliary collector detachably secured to the first named collectors and provided with means for preventing entanglement of the overhead line structure with the said pair of collectors.

In testimony whereof, I have hereunto subscribed my name this 26th day of June 1922.

LELAND F. BURNHAM.